Patented June 3, 1941

2,243,871

UNITED STATES PATENT OFFICE 2,243,871

METHOD OF MAKING PROTEIN PRODUCTS

James N. Lawrence and Russell H. Hieronymus, Cincinnati, Ohio, assignors to The Drackett Company, Cincinnati, Ohio, a corporation of Ohio No Drawing. Application March 9, 1937, Serial No. 129,920

14 Claims. (Cl. 260—112)

The present invention relates to a method of making protein products and has for its principal object the provision of a novel and simple method of producing said product economically and under improved operating conditions.

Another object of the invention is to provide a method of extraction of protein from oleaginous seeds such as soybeans, cottonseed and kindred materials, including the rape seed, peanuts, hemp seed, et cetera, which will produce good yields of protein of high quality for adhesive purposes.

A further object of the invention is to provide a method of extracting protein from the sources referred to which yields products that are suitable for the manufacture of adhesives for paper coatings.

Another object of the invention is to provide a method of extracting protein from oleaginous seed materials which avoids the objections inherent in heretofore practiced methods, namely, the tendency to decomposition of the protein into degradation products of lower adhesive strength, and the requirement of solutions of high concentration to effect solvent action.

Another object of the invention is to provide a method and means of extracting protein from the materials referred to with extractive media that do not cause difficult operating conditions in precipitating, settling, filtering, washing and drying.

These and other objects are attained by the method and means hereinafter more fully set forth in the following specification and claims.

Heretofore, the extraction of protein from oleaginous seed materials was effected with the use of metal hydroxides, carbonates and oxides, ammonium hydroxide, alkaline earth hydroxides, inorganic salts which give basic reactions in aqueous solutions and neutral inorganic salts, such as sodium chloride and sodium or potassium sulfate. The hydroxides, oxides and carbonates tend to decompose the protein into products which have lower adhesive strength and are for that reason objectionable. The neutral salts require high concentration of solution to effect solvent action, and, therefore, leave much to be desired. Furthermore, many of the substances give low yields or a protein which is inferior for use where a high adhesive strength is essential. Moreover, many of the extractive media cause difficulties in operating conditions, particularly in precipitating, settling, filtering, washing and drying.

By the method of the present invention, improved operating conditions are attained and a protein product having superior adhesive properties results therefrom.

The method may be practiced with increased economy over previously known methods. The resultant product is characterized by a combination of properties that make it very desirable for industrial purposes in making paper coatings, adhesives, et cetera. These properties are high adhesive strength, low viscosity, the absence of troublesome foaming when mixed with the other ingredients of the end product desired, and ready solubility.

It has heretofore been proposed to subject protein material to special treatment, either before or after its extraction from source material in an attempt to improve the useful properties thereof in the end product. The method herein described, obviates any such special treatment, and yields an extracted protein that is superior as to the stated desirable properties.

By the method of the present invention, we avoid the use of the aforementioned extractive media and in lieu thereof employ an aqueous amine solution of very low concentration and obtain good yields of protein of very high quality. The method of protein extraction of this invention may be carried out in various ways and on various materials, the scope of which will be more fully understood from the following examples and the description thereof.

The following practical examples are given by way of illustration and are not to be considered as limited to the specific conditions set forth.

*Example I.*—Heat 100 parts of comminuted seeds from which the oil has been largely removed with 800 parts 0.3% triethanolamine solution at 45°–65° C. for about forty-five (45) minutes. Separate the solution from the undissolved matter by any suitable means such as filtration or centrifuging. Heat the solution to 60°–70° C. and then precipitate the protein by adjusting the pH to approximately the isoelectric point with a suitable acid such as sulfuric, sulfurous, hydrochloric or acetic. Allow to stand without agitation until the protein has settled and the supernatant liquid is clear. The precipitated protein is then separated by suitable means such as filtration or centrifuging. The product at this point may be used in formulating various adhesive or coating compounds, or it may be dried and ground. In the dried condition the material has good keeping qualities and is readily soluble in alkaline solutions.

It is to be understood that in the above described method, time, temperature and concentration of amine are variables and that considerable variation is permissible with respect to them. In general, increase of temperature or of concentration of amine will decrease the time of extraction and vice versa. Furthermore, when the ratio of aqueous amine solution to comminuted seeds is increased, the time of extraction is decreased within certain limits. The ratios of amine solution to comminuted seeds from 4:1 to 12:1 are satisfactory as to yield, quality and ease of handling.

It has further been found that the use of these amine solutions under the conditions enumerated above makes it possible to obtain a selective solvent action on the protein in the comminuted seeds and to obtain that portion which is more desiraable for adhesives, particularly for paper coatings, than that which is obtained when metal hydroxides or other agents enumerated above are used for extraction media. The protein material thus obtained, with its combined desirable properties, is superior in many respects to heretofore available proteins or milk casein when incorporated in the end products which may be coatings for paper, adhesives or other materials of the same category that are used in various industries.

It has further been found that when protein is extracted by an aqueous solution of an amine in the manner generally indicated, it is not necessary to use alcohol or other organic precipitants to separate the protein. Mineral acids such as sulfuric, hydrochloric and sulfurous acids and such organic acids as acetic and chlorinated derivatives of such acids act as satisfactory precipitants.

It has furthermore been found that when precipitating the protein, elevated temperatures such as from 60°–70° C. are helpful and that the use of such elevated temperatures improves the coagulation of the protein and facilitates subsequent operations such as filtering, washing, and drying.

It has also been found that it is not necessary to wash the protein in order to produce a material suitable for making paper coatings when such precipitants as sulfurous acid are used in connection with the recommended other conditions. However, the procedure outlined permits of the washing operation which is desirable to free it from acid when the protein is to be used for edible purposes.

After separating the protein from its mother liquor it may be dried at a relatively low temperature. We have found that 40°–45° C. are desirable temperatures for this operation but higher temperatures are permissible. The protein after drying may be ground to a suitable size, e. g., 40 to 60 mesh.

The following are given as further examples of the application of the invention to the extraction of protein:

*Example II.*—100 parts of comminuted seeds from which the oil has been largely separated, are extracted with 1200 parts of 0.2% monoamylamine solution at 75° C. for 30 minutes. The solution is filtered off and the residue washed with water. The filtrate is treated with sulfuric acid solution until the iso-electric point is reached. The protein is recovered by filtering or centrifuging and is dried at 60° C.

*Example III.*—100 parts of comminuted seeds from which the oil has been largely separated, are extracted with 900 parts of a 0.5% diamino isopropanol solution for 60 minutes at 50° C. The protein solution is filtered from the insoluble portion and this residue is washed with 150 parts of warm water. The protein is precipitated by acidifying with dilute hydrochloric acid. Then the protein is filtered from the mother liquor, washed until free from acid and dried at 40° C.

*Example IV.*—100 parts of comminuted seeds from which the oil has been largely removed, are extracted with 500 parts of 1.0% triethanolamine solution at 60° C. for 30 minutes. The residue is filtered off and washed with warm water. The protein is precipitated by adding acetic acid to the filtrate, separated from the mother liquor by filtration, washed with water and dried at 60° C.

*Example V.*—100 parts of comminuted seeds from which the oil has been largely removed, are extracted with 200 parts of a 0.1% ethylene diamine solution at 40° C. for 12 hours. The protein solution is separated from the undissolved portion by filtration and treated with sulfur dioxide until precipitation is complete. The precipitated protein is washed by decantation, filtered and dried at 40° C.

The amines which are suitable for extracting protein by the method of this invention include primary, secondary and tertiary amines of aliphatic alcohols; for example, such as the ethanolamines; amines of hydrocarbons, for example, such as ethylene diamine, monoamylamine, et cetera, and amines of the type of diamino isopropanol.

The amine solutions are useful, as previously indicated, to obtain a selective solvent action on the proteins in the comminuted seed materials from various sources so that those skilled in the art, may in each instance attain a good yield of protein product of the desired characteristics and under improved and economical operating conditions.

What is claimed is:

1. The process of rapidly extracting protein from oleaginous seed material which comprises the step of treating comminuted seed material from which the oil has been largely removed, with an amine selected from the group consisting of watersoluble aliphatic amines and amino alcohols of from 0.1% to 1.0% concentration in aqueous solution.

2. A rapid and selective process of extracting protein from oleaginous seed material which consists in treating comminuted seed material from which the oil has been largely removed, with an aqueous amine solution containing amines selected from the group consisting of water soluble aliphatic amines and amino alcohols in a concentration range of 0.1% to 1.0% and then precipitating and separating the selected protein from the solution.

3. The process of rapidly extracting protein from oleaginous seed material which comprises the step of treating comminuted seed material from which the oil has been largely removed, with a heated aqueous amine solution containing amines selected from the group consisting of water soluble aliphatic amines and amino alcohols of a concentration of from about 0.1% to about 1.0% at from 40° C. to 75° C.

4. The process of extracting protein from oleaginous seed material which comprises treating the seed material from which the oil has been largely removed, with an aqueous solution containing an amine selected from the group consisting of the primary, secondary and tertiary amines of aliphatic alcohols and water soluble amines of hydrocarbons.

5. The process of extracting protein from oleaginous seed material which comprises treating the seed material from which the oil has been largely removed, with an aqueous solution containing an amine selected from the group consisting of the primary, secondary and tertiary amines of aliphatic alcohols and watersoluble amines of hydrocarbons for a selected time, from about 30 minutes to 12 hours, then separating the solution from undissolved matter, then heating the solution and adjusting the pH to approximately the iso-electric point with an acid to precipitate the protein, then separating the precipitate and drying.

6. The process of extracting protein from oleaginous seed material from which the oil has been largely removed, which comprises treating said material at temperatures from 15° C. to 75° C. with from four to twelve parts of dilute aqueous amine solution containing amines selected from the group consisting of watersoluble aliphatic amines and amino alcohols of from 0.1% to 1.0% concentration, then separating the solution from undissolved matter and precipitating the protein by heating the solution to a temperature of from 60° to 70° C. and adjusting the pH to approximately the iso-electric point with an acid, then separating the precipitate and drying it at relatively low temperature.

7. The process of extracting protein from oleaginous seed material from which the oil has been largely removed, which comprises heating said material with from four to twelve parts of dilute aqueous amine solution containing amines selected from the group consisting of watersoluble aliphatic amines and amino alcohols of from 0.1% to 1.0% concentration, then separating the solution from undissolved matter, washing the undissolved matter with warm water, separating the wash water and adding it to the solution and precipitating the protein by heating the solution to a temperature of from 60° to 70° C. and adjusting the pH to approximately the iso-electric point with an acid, then separating the precipitate and drying it at relatively low temperature.

8. The process of extracting protein from oleaginous seed material from which the oil has been largely removed, which comprises heating said material with from four to twelve parts of the dilute aqueous amine solution containing amines selected from the group consisting of watersoluble aliphatic amines and amino alcohols of from 0.1% to 1.0% concentration, then separating the solution from undissolved matter and precipitating the protein by heating the solution to a temperature of from 60° to 70° C. and adjusting the pH to approximately the isoelectric point with an acid, then separating the precipitate, washing the precipitated protein to remove the acid, separating the protein by suitable means and drying at low temperature.

9. The process of extracting protein from oleaginous seed material that is largely freed of oil, which comprises heating said material with from four to twelve parts of dilute aqueous amine solution containing amines selected from the group consisting of watersoluble aliphatic amines and amino alcohols of from 0.1% to 1.0% concentration, then separating the solution from undissolved matter and precipitating the protein by heating the solution to a temperature of from 60° to 70° C. and adjusting the pH to approximately the isoelectric point with an acid, then separating the precipitate.

10. The process of extracting protein from comminuted seed material which comprises treating the seed material, from which the oil has been largely removed, with a dilute aqueous solution of triethanolamine to place the protein in solution, then precipitating the protein and finally separating the precipitated protein from the liquid.

11. The process of extracting protein from comminuted seed material which comprises treating the seed material, from which the oil has been largely removed, with a dilute aqueous solution of diamino isopropanol to place the protein in solution, then precipitating the protein and finally separating the precipitated protein from the liquid.

12. The process of extracting protein from comminuted seed material which comprises treating the seed material, from which the oil has been largely removed, with a dilute aqueous solution of ethylene diamine to place the protein in solution, then precipitating the protein and finally separating the precipitated protein from the liquid.

13. The process of effecting rapid extraction of selected protein of high adhesive strength and low viscosity from oleaginous seed material from which the oil has been largely removed which comprises treating said material with a dilute amine solution comprising amines selected from the group consisting of watersoluble aliphatic amines and amino alcohols and removing the dissolved protein from the solution.

14. The direct and selective process for producing isolated proteins of high adhesive strength and low viscosity which comprises the initial step of subjecting comminuted oleaginous seed material from which the oil has been largely removed with a dilute amine solution comprising amines selected from the group consisting of watersoluble aliphatic amines and amino alcohols for placing the selected protein in solution in substantially unaltered condition.

JAMES N. LAWRENCE.
RUSSELL H. HIERONYMUS.